US008886761B2

(12) United States Patent
Hopkins et al.

(10) Patent No.: US 8,886,761 B2
(45) Date of Patent: Nov. 11, 2014

(54) FLEXIBLE TOKEN FOR USE IN CONTENT DELIVERY

(75) Inventors: Bill Hopkins, Brighton, CO (US); Jin-Gen Wang, Lafayette, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 12/495,990

(22) Filed: Jul. 1, 2009

(65) Prior Publication Data

US 2011/0004929 A1 Jan. 6, 2011

(51) Int. Cl.
*G06F 15/16* (2006.01)
*G06Q 30/02* (2012.01)
(52) U.S. Cl.
CPC .................................... *G06Q 30/02* (2013.01)
USPC .............................. 709/219; 709/217; 726/20
(58) Field of Classification Search
USPC .............................. 709/217, 219, 250; 726/20
See application file for complete search history.

(56) References Cited

U.S. PATENT DOCUMENTS

| 6,385,596 | B1* | 5/2002 | Wiser et al. ....................... 705/51 |
| 7,139,844 | B2* | 11/2006 | Smith et al. ..................... 709/250 |
| 7,796,014 | B2* | 9/2010 | Traub et al. ................... 340/10.1 |
| 7,900,245 | B1* | 3/2011 | Geddes et al. ..................... 726/9 |
| 2002/0056004 | A1 | 5/2002 | Smith et al. |
| 2004/0088348 | A1 | 5/2004 | Yeager et al. |
| 2004/0162871 | A1 | 8/2004 | Pabla et al. |
| 2004/0226051 | A1 | 11/2004 | Carney et al. |
| 2005/0278259 | A1 | 12/2005 | Gunaseelan et al. |
| 2006/0031225 | A1 | 2/2006 | Palmeri et al. |
| 2007/0250560 | A1 | 10/2007 | Wein et al. |
| 2008/0126798 | A1* | 5/2008 | Ginter et al. ................... 713/164 |
| 2010/0131584 | A1* | 5/2010 | Johnson ......................... 709/203 |

FOREIGN PATENT DOCUMENTS

| JP | 2004-506272 A | 2/2003 |
| JP | 2004-094659 | 3/2004 |
| JP | 2006-155508 | 6/2006 |
| KR | 2008-0058441 | 6/2008 |

OTHER PUBLICATIONS

International Search Report from WIPO, International Application No. PCT/US 10/040693, International Filing Date Jul. 1, 2010, Date of mailing ISR Sep. 21, 2010, 3 pages.
Written Opinion, International Application No. PCT/US 10/040693, International Filing Date Jul. 1, 2010, Date of mailing Written Opinion Sep. 21, 2010, 5 pages.
Japanese Examination Report, dated Dec. 17, 2013, Application No. 2012-517903, filed Jul. 1, 2010; 3 pgs.
Korean Examination Report, dated Dec. 24, 2013, Application No. 2012-7000201, filed Jul. 1, 2010; 6 pgs.

(Continued)

*Primary Examiner* — David Lazaro
*Assistant Examiner* — Marie Georges Henry

(57) ABSTRACT

An embodiment of a system for managing delivery of content to end users includes a semantics generator configured to generate name/value pair semantics for name/value pairs that can be included in flexible tokens, a semantics publisher configured to publish the name/value pair semantics in a menu, wherein the name/value pair semantics are selectable, a flexible token interpreter configured to interpret name/value pairs included in flexible tokens according to the name/value pair semantics, the flexible token interpreter further configured to determine responses to content requests based on the name/value pairs included in flexible tokens, and an edge server configured to generate token-dependent responses to content requests based on determined responses from the flexible token interpreter.

29 Claims, 9 Drawing Sheets

(56) References Cited

OTHER PUBLICATIONS

Japan Examination Report, dated May 14, 2013, Application No. 2012-517903, 5 pgs.
Korean Examination Report dated Jun. 26, 2013, Application No. 10-2012-7000201, 9 pgs.
Chinese Examination Report, dated Dec. 4, 2013, Application No. 201080029755.4, filed Jul. 1, 2010; 16 pgs.
Canada Examination Report, dated Nov. 12, 2013, Application No. 2,766,959, filed Jul. 1, 2010; 5 pgs.

* cited by examiner

FLEXIBLE TOKEN FOR USE IN CONTENT DELIVERY

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright © 2009 Level 3 Communications, LLC.

TECHNICAL FIELD

Embodiments presently disclosed generally relate to handling requests for content. More specifically, embodiments herein relate to a flexible token for use in content delivery.

BACKGROUND

Internet use has grown quickly in recent history and indications are that Internet use will continue to grow. Users access the internet to view all types of content. Today, users can view live presentations of events, such as sporting events, as well as stored content, such as videos and pictures. The providers of such content typically want to have some level of control over the manner in which the content is viewed and by whom. For example, the provider of videos may want certain videos (e.g., selected videos, or type or class of videos) to be encrypted upon distribution.

Typically providers of Internet content are separate entities from the network providers that provide the infrastructure to distribute the content. To reach a very large audience, content providers typically purchase the services of a content delivery network provider, which generally has a large network infrastructure for distributing the content. However, because content providers typically don't have control over distribution, the providers typically have limited control over how, or to whom, the content is distributed.

Although content providers can specify to some extent how content is to be distributed, conventional approaches have been quite limited. For example, a content provider can generate a Uniform Resource Locator (URL) that includes data that the content distributor can use to determine how to distribute the content. However, the form and values available for URL data is fixed and limited to a particular set. The content provider must abide by particular formats and values so that the specification of terms of content distribution is unambiguous to the content distributor. Although relatively standardized, this fixed approach does not enable the content provider a variety of ways or flexibility in specifying how content is to be distributed.

SUMMARY

Embodiments presently disclosed generally relate to handling requests for content. More specifically, embodiments herein relate to a flexible token for use in managing content delivery. Embodiments provide a flexible approach for a content provider to specify the manner of content distribution. The content provider can insert a flexible token, including one or more parameters, into a content designator (such as a Uniform Resource Identifier (URI) or Uniform Resource Locator (URL)), and the flexible token can be read by the content distributor. The content distributor can use the flexible token to determine the manner of content distribution.

An embodiment of a computer implemented method includes generating a menu of token semantics, wherein the token semantics specify one or more parameter names available for inclusion in a flexible token, wherein the flexible token is configured to include one or more parameter name/value pairs, and wherein the one or more parameter name/value pairs can occur in any order. The method may further include receiving a selection of one or more of the token semantics, receiving a tokenized content designator including a flexible token having one or more parameter name/value pairs formatted according to the selected one or more token semantics, interpreting the one or more parameter name/value pairs according to the selected one or more token semantics, and determining a response to the tokenized content designator based on the interpreted one or more parameter name/value pairs.

In one embodiment of the computer implemented method the parameter name/value pairs specify business logic. Further, the one or more parameter name/value pairs may include embedded parameter name/value pairs. The response may include one or more of a message, content designated by the tokenized content designator, or alternative content. The flexible token may be generated by a content provider. The content provider may insert the flexible token in the tokenized content designator and send the tokenized content designator to an end user who requested the designated content.

In yet another embodiment of the computer implemented method, the method further comprises sending a token-dependent response to an end user. Further still, the one or more parameter name/value pairs can include one or more geographic name/value pairs, one or more time name/value pairs, one or more encryption name/value pairs, and an alternative content name/value pair.

An embodiment of a system for managing delivery of content to end users includes a semantics generator configured to generate name/value pair semantics for name/value pairs that can be included in flexible tokens, and a semantics publisher configured to publish the name/value pair semantics in a menu, wherein the name/value pair semantics are selectable. The system may further include a flexible token interpreter configured to interpret name/value pairs included in flexible tokens according to the name/value pair semantics. The flexible token interpreter may be further configured to determine responses to content requests based on the name/value pairs included in flexible tokens. The system may further include an edge server configured to generate token-dependent responses to content requests based on determined responses from the flexible token interpreter.

Still further, in an embodiment of the system at least one flexible token may include an embedded name/value pair. The name/value pairs may include one or more location name/value pairs, one or more time name/value pairs, one or more encryption name/value pairs, or an alternative content name/value pair. One or more name/value pair semantics may be selected by a semantics selector of a customer. The name/value pair semantics may be monetized. The edge server may receive the flexible tokens embedded in content designators and send the flexible tokens to the flexible token interpreter.

An embodiment of a computer program product includes computer-readable media that stores computer-executable instructions, which, when executed by a computer, cause the computer to carry out a process. The process may include receiving a tokenized content designator specifying requested content, wherein the tokenized content designator includes a flexible token indicating terms of responding to receipt of the content designator, interpreting name/value pairs included in the flexible token, wherein the name/value pairs are order-independent. The process may further include generating a response to the content designator based on interpretation of the order-independent name/value pairs.

Still further, in an embodiment of the computer program product the process may include determining whether the requested content should be sent in response to receipt of the content designator. The process may further include generating a set of name/value pair semantics that are selectable by a content provider. The process may further include monetizing the semantic name/value pairs. The tokenized content designator may be generated by the content provider. The process may further include receiving selections from the set of name/value pair semantics from the content provider.

DETAILED DESCRIPTION

Figure 1:
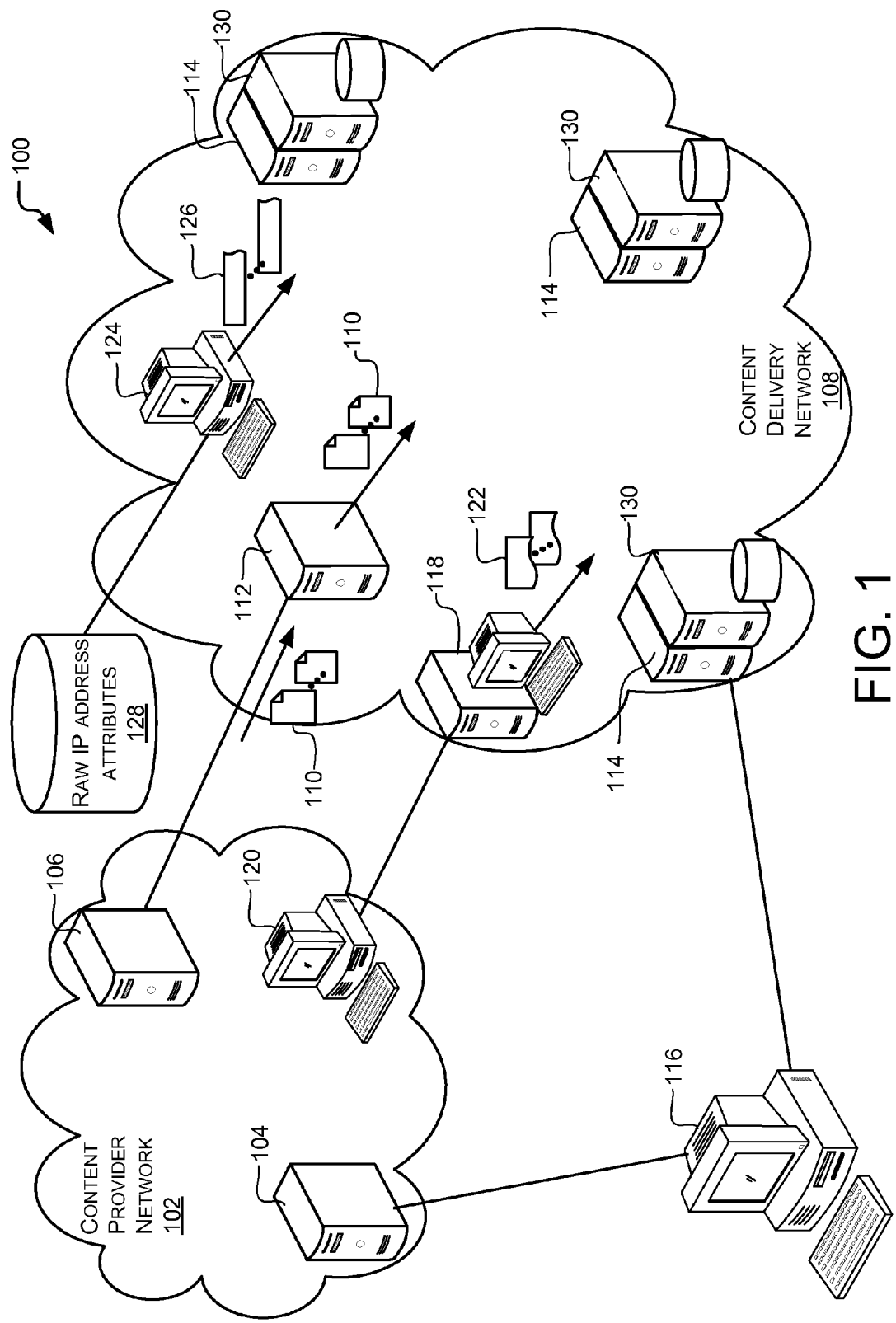
FIG. 1 illustrates an example network environment suitable for using flexible tokens to handle content requests.

Embodiments presently disclosed generally relate to handling requests for content. More specifically, embodiments herein relate to a flexible token for use in managing content delivery. Embodiments provide a flexible approach for a content provider to specify the manner of content distribution. The content provider can insert a flexible token, including one or more parameters, into a content designator (such as a Uniform Resource Identifier (URI) or Uniform Resource Locator (URL)), and the flexible token can be read by the content distributor. The content distributor uses the flexible token to determine the manner of content distribution.

In some embodiments, the content distributor generates a menu of token semantics. The semantics can designate terms and format of parameters in the content designator. In one embodiment the format of the parameters is a name/value pair format. The menu of name/value pair semantics is typically generated in advance of requests for, and delivery of, content. The content provider can choose one or more of the token semantics that the content provider will use to specify how to deliver content. Token semantics may be chosen individually or certain ones of the semantics may be bundled, whereby bundles of semantics are selectable for use by the content provider in designating how to deliver content.

In some embodiments the content distributor can monetize items in the menu of name/value pair semantics. The monetization may allow for a per unit discount when the content provider selects more semantics from the menu. For example, the content distributor could charge the content provider a fixed price for each semantic chosen individually, but may charge less per unit as more semantics are chosen. The content distributor can charge bundled rates for bundled sets of semantics. The semantics can be selected for inclusion in bundles to allow for optimization of the content distributor's distribution systems and processes.

In various embodiments the flexible token includes a list of parameters and a digest. The digest can be used for data integrity and source authentication. The parameters define constraints to be satisfied in relation to distribution of content. The parameters can be of numerous different types and values. For example, the parameter list can include date, time, protocol, encryption designator, encryption type, geographic location(s), alternative content, and/or others.

In an embodiment, a content designator includes a protocol, host, resource path and flexible token parameter(s). The protocol can be, but is not limited to, real time streaming protocol (RTSP), RTSP UDP (RTSPU), RTSP TCP (RTSPT), real time messaging protocol (RTMP), RTMP encryption (RTMPE), RTMP SSL-encryption (RTMPS) or hypertext transport protocol (HTTP). The host can be, but is not limited to, a dotted domain path or an Internet Protocol (IP) address in dotted decimal form. The resource path can be, but is not limited to, one or more directories or subdirectories. Each token parameter can be, but is not limited to, a name/value pair. Parameter name/value pairs can be used to specify numerous types of data including, but not limited to, business logic and terms of responding to a request for content. The business logic and terms of response can specify the manner of responding and/or whether to respond at all to a content request embodied in a content designator.

The name specifies the parameter name and the value specifies the value associated with the parameter. Numerous types of values can be specified including, but not limited to encryption designator, encryption type, time span (e.g., a time when the content request is valid), one or more geographic regions within which the content request is valid, alternative content, or others. For example, a parameter name/value pair may specify a time span with a statement such as "start_time=<date and time>", wherein <date and time> specifies a date and time according to a format.

As another example, a parameter name/value may specify one or more geographic regions with a statement such as "location=<country code(s)>", wherein the country code(s) can be any country designator format. For example, some country codes could be UK (United Kingdom), GB (Great Britain), US (United States), CA (Canada), CH (China), JP (Japan) etc. Encryption and encryption type can be specified with a parameter name/value pair such as "encryption=<Yes or No>" and "encryption type=<encryption type code>".

As yet another example, an alternative content name/value pair may take the form "alternative content=<alternative content name or path>", wherein <alternative content name or path> identifies alternative content to be sent to the requesting end user in place of the requested content. In some embodiments, if alternative content is specified, the alternative content is sent only if other parameter constraints (e.g., time span or location) in the token are not satisfied. In other embodiments, if alternative content is specified, then the specified alternative content is sent, regardless of whether other parameter constraints exist or are satisfied.

Furthermore, different types of token values can be embedded in other types of token values. For example, start and end times can be specified within particular geographic regions. Using embedded name/value pairs, a content provider can specify that the content request is valid for specified times within each of one or more geographic regions, and the specified times may be different for each of the one or more geographic regions. As another example, the content provider can specify whether encryption is used in each of one or more specified geographic regions and/or during specified time periods, and different encryption types may be specified for different geographic locations and/or time spans.

In various embodiments the token is flexible enough that it does not need to include all or any of the parameters from a selected set of semantics in the list. In other words, even though the content provider may select a particular set of one or more token semantics, the content provider does not need to generate the token in a fixed way that includes all the parameters of the semantics. The content distributor can determine, based on the semantics of a token, the meaning of the parameters in the list even if the order of parameters is changed or parameters are included in, or removed from, the content designator in any given content request. The parameters are therefore order-independent.

In some embodiments, flexible tokens can include parameters that set forth constraints related to distributing content. For example, parameters can limit distribution to particular geographic areas, such as cities, states, provinces, countries and/or continents. As another example, the parameters in the flexible token can limit distribution of content to particular dates or times. Parameters may use various combinations of constraints. Thus, for example, distribution could be constrained to particular geographic regions at particular times.

In some embodiments, flexible tokens can include parameters that specify alternatives when the constraints are not met. For example, a parameter may specify that an alternative content should be delivered if the constraints are not met. Alternatively, a message (e.g., error message) may be delivered if the constraints are not met. A message may include virtually any type of information or prompts to the end user. For example, the message may prompt the user to sign up for a particular service. This may be useful for example, if the content provider wishes to market particular services to particular users (e.g., users in a given geographic area or demographic group). Various example token, URI and parameter formats are shown and discussed below; however, tokens, URIs and parameters are not limited to those particular formats shown.

FIG. 1 illustrates an example network environment 100 suitable for using flexible tokens in content distribution according to various embodiments. A content provider maintains a content provider network 102, which may include one or more web page servers 104 and one or more content origin servers 106. A content delivery network (CDN) 108 includes infrastructure for hosting content from the content provider. In the environment 100 of FIG. 1, the content provider may be a customer of the CDN 108 provider, whereby the CDN 108 provider agrees to host content from the content provider.

For example, in various embodiments, content 110 may be propagated from the content origin server 106 of the content provider network 102 to one or more content distribution servers 112 of the CDN 108. The content 110 can be hosted from one or more content distribution servers 112. Alternatively, or in addition, at least some of the content 110 may be stored on, and hosted by, one or more edge servers 114. For example, content may be delivered to the edge servers 114 from the origin server 106 or the distribution server 112. Edge servers 114 may be strategically located within the CDN 108 to provide for geographic proximity to end users, load balancing, or to enhance other performance measures.

A computer end user (not shown) uses a computer 116 to access various network resources such as resources of the content provider network 102 or the CDN 108. Typically, the computer 116 executes a network browser application, such as Internet Explorer™ or Firefox™, for accessing network resources. The computer 116 may also execute a streaming media player, such as Flash Media Player™ or Quicktime™. Through the applications running on computer 116 the user can view, listen to, and otherwise experience content, such as, but not limited to, video, audio, multimedia, images, photographs, web pages, text and others.

For a number of reasons, the content provider may wish to specify how, or whether, content is accessible to the end user. The content provider may wish to specify such accessibility, if any, based on a number of attributes associated with the end user. For example, the content provider may provide a live streaming webcast of a sporting event, which is hosted by the CDN 108. Due to licensing agreements, the content provider may want the live webcast to be accessible only to end users in certain geographic areas. Of course, the end-user of computer 116 may or may not reside within those geographic areas. As another example, a content provider may wish to provide an alternate content item, such as a video clip, if content requested by the end user is unavailable.

To accommodate such content accessibility desires, the CDN 108 includes utilities and functionality whereby content accessibility rules can be defined and business logic generated to handle requests in specified ways. Such rules are typically based on IP addresses of the computers (e.g., computer 116) that issue the content requests, as well as attributes associated with the IP addresses. Rules can specify how to handle a request based on a number of attributes, which can be determined at the time of a request based on the IP address. In this regard, the CDN 108 includes IP address correlation data that characterizes different attributes associated with numerous IP addresses that could be the source of requests, so that rules can be applied based on IP address attributes.

For example, in the embodiment of FIG. 1, the CDN 108 includes a rule generator server 118 operable to receive rule specifications from, for example, an administration computer 120 of the content provider network 102. The rule generator server 118 includes a functional module operable to provide a user interface to the user of computer 120. The user of computer 120, such as a network administrator, can specify content accessibility rules through the user interface. The rule generator server 118 includes functionality for interpreting rule specifications and editing, reformatting or encoding rule specifications into software implemented business logic 122.

In one embodiment, the rule generator server 118 is a network operations computer, which an administrator of the CDN 108 can use to process the rules specifications. In this regard, the functional modules of the rule generator server 118 may provide another user interface through which a user can view the specified rules, edit them and/or reformat them. The rule generator server 118 allows for manual and/or automated generation of rule-based computer executable business logic 122. In one embodiment, the rule-based computer executable business logic 122 is represented in Extensible Markup Language (XML) format.

In the illustrated embodiment, a provisioning tool 124 is provided to generate IP address attribute map entries 126 that associate each of many IP addresses to a set of attributes. The provisioning tool 124 may obtain raw IP address attribute data from a repository 128 and format the data into a parseable and indexible format.

In accordance with various embodiments, the business logic 122 from the rule generator server 118 and IP address attribute map entries 126 are deployed on one or more request authorization server (RAS) computers 130 in the CDN 108. Each RAS computer 130 is geographically proximate to one or more respective edge servers 114. RAS computers 130 include functionality to apply the business logic 122 to attribute values related to content requests received from end-user devices, such as computer 116, in order to generate rule-based responses to those requests. More specifically, the RAS computers 130 include a token interpreter that interprets parameter name/value pairs included in tokenized content designators (e.g., URL or URI). The following figures and description further describe particular embodiments of the various processes and systems shown in FIG. 1.

Figure 2:
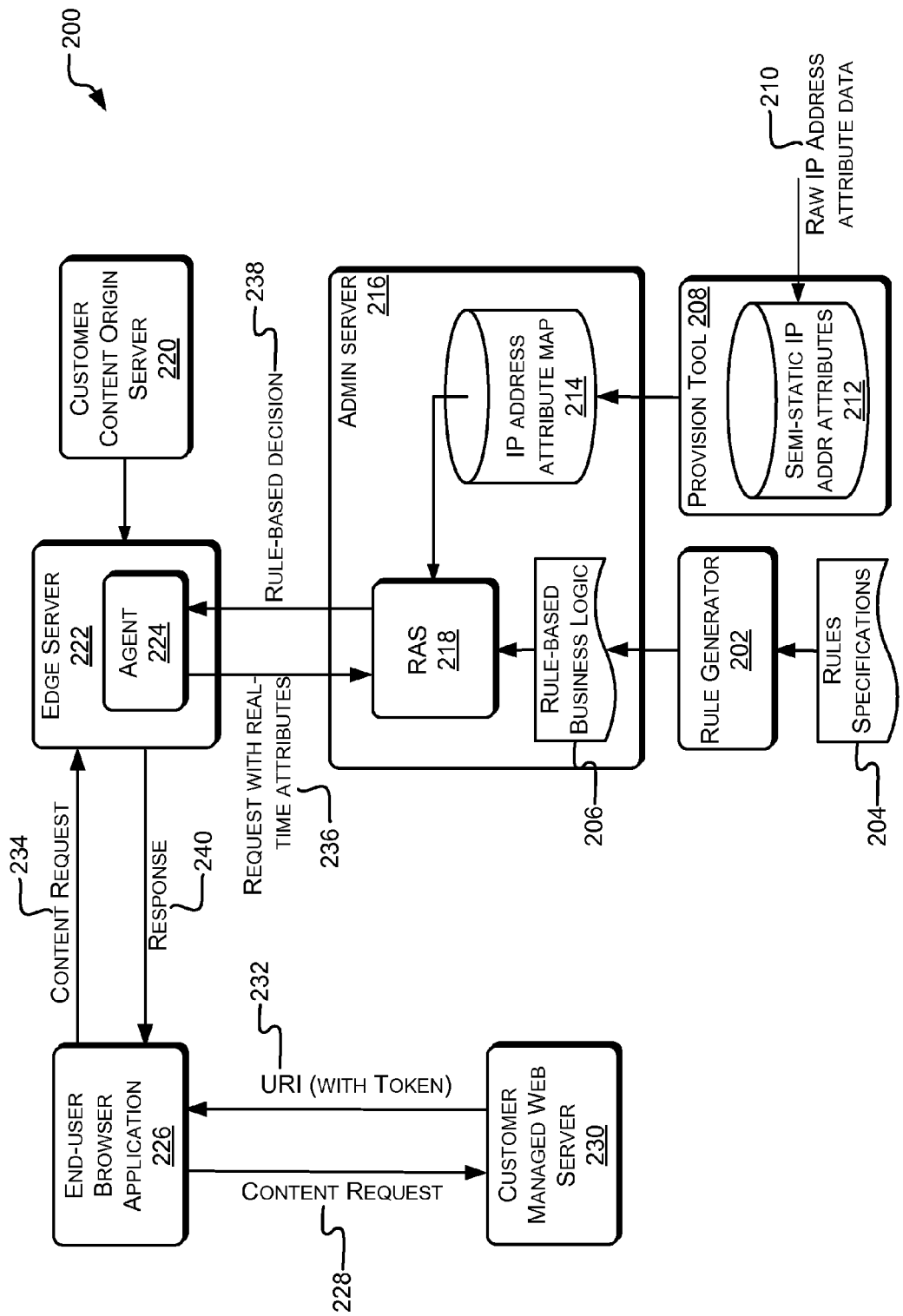
FIG. 2 illustrates a system in terms of functional modules operable to handle content requests using flexible tokens.

FIG. 2 is a functional block diagram illustrating modules in a system 200 operable to carry out rule-based handling of content requests using flexible tokens according to various embodiments. The system 200 can be thought of as including a configuration portion or process and a real-time content request handling portion or process. The configuration portion generates and deploys rule-based business logic and formatted IP address attribute data to request authorization servers (RAS's). The real-time request handling portion applies the rule-based business logic to attribute values associated with real-time content requests to make decisions about how to handle content requests. The various functional modules displayed in the system of FIG. 2 may be implemented in the devices and networks shown in the environment of FIG. 1.

As part of the configuration process, a rule generator 202 receives rules specifications 204 from a customer, such as a content provider. The rule generator 202 is configured to generate computer executable rule-based business logic based on the rules specifications. The rule-based business logic may be in the form of one or more Extensible Markup Language (XML) programs 206. The business logic may be implemented by way of a hierarchy of data driven decision nodes. Through the rule generator 202, decision nodes may be mapped to rules specified by the customer.

As another part of the configuration process, a provisioning tool 208 receives and processes raw IP address attribute data 210. In one embodiment, the raw IP address attribute data 210 is obtained from a commercially available source, such as Quova™. The IP address attribute data maps IP addresses, either individually or in ranges, to a number of semi-static attribute values associated with the IP addresses. For example, the attribute data may include the country, city, zip code and autonomous system number in which each IP address resides. The attribute data may also include the continent, state, designated market area, metropolitan statistical area, connection type, line speed and IP routing type associated with the IP addresses.

The term semi-static is used to indicate that the attribute values may change from time to time, but such change is relatively infrequent for any particular IP address. For example, the semi-static attribute values may change only every few years for a given IP address. However, the raw IP attribute data 210 may change more or less frequently, such as weekly or monthly. In one implementation, in the case of Quova™ data, the IP address attribute data is retrieved weekly, but typically only a small percentage of IP addresses have changes associated with them. The raw IP address attribute data 210 is stored in a data store 212, where it can be processed by the provisioning tool 208.

The provisioning tool 208 typically formats the raw IP address attribute data 210 so that the data is indexible by IP address. In some embodiments, the provisioning tool 208 generates an IP address attribute map, such as is discussed below, which is a data structure that can be indexed by IP address to retrieve attribute values associated with the IP address. After formatting, the IP address attribute map 214 is provisioned on an administrative server 216. Similarly, the rule-based business logic 206 is provisioned onto a request authorization server 218 of the administrative server 216.

When a content request is processed, content is downloaded from the customer content origin server 220 (or a CDN distribution server) to an edge server 222 being administered by administration server 216 if the requested content is not on the edge server 222. The edge server 222 includes a software agent 224, which is operable to gather attribute data from content requests received at the edge server 222. The agent 224 is configured to identify selected attribute values of one or more attribute types, package (e.g., format) the attribute values, and send them to the RAS 218.

The request authorization server (RAS) 218 is configured to apply the rule-based business logic 206 to attribute values associated with content requests. As such, during operation, as requests are received, the RAS 218 uses attribute values determined in part from the request, to decide how to handle the request. Handling the request may involve allowing the content request, denying the content request or redirecting the content request.

For example, an end user's browser application 226 may generate a request 228 for content when the user selects a hyperlink referencing the associated content from a web page hosted on a customer managed web server 230. The request 228 may be in a GET request, in the case of HTTP. The request 228 is sent to, and received by, the customer managed web server 230. The response from the web server 230 includes a uniform resource identifier (URI) that references the location of the desired content item. A flexible token may be embedded in the URI. An example URI that may be generated is shown below:

rtmp://mediacorpfs.fplive.net/mediacorp/drama/george_and_carla.flv

Parts of the URI above are exemplary attribute values that may be used by the RAS 218 in handling the content request. For example "rtmp" designates a protocol, which is a possible attribute type. As another example, "mediacorp" is a customer identifier (ID), which is another possible attribute type. As yet another example, "flv" is the file type, which is yet another possible attribute type. All of the foregoing attribute values may be used in the decision as to how to handle the request.

As mentioned, in some embodiments, the customer can include a flexible token in the URI. The URI shown above does not have an embedded token. The example URI below has an embedded flexible token:

rtmp://mediacorpfs.fplive.net/mediacorp/drama/george_and_carla.flv?token=F71A05E224B90016.

In the example URI above, the flexible token value F71A05E224B90016 has been inserted. The flexible token value may be a hashed or encrypted value that can be decoded or decrypted by the RAS 218. The token may specify one or more attribute values, such as a time constraint, a coupon, or others.

After receiving the URI 232, the browser application 226 generates another content request 234 to the edge server 222. The selection of the edge server 222 may occur based on a domain name system (DNS) query, in which the destination of URI 232 is resolved to the IP address of the edge server 222. When the edge server 222 receives the content request 234, the agent 224 parses the request 234 and extracts attribute values which the agent 224 is configured to gather.

For example, in some embodiments the agent 224 may be configured to gather the IP address, customer ID, protocol, file type and resource. These, and other, types of attributes may be referred to as real-time attributes. Other types of real-time attributes are, for example, directory and resource. The agent 224 packages the real-time attribute values it receives and communicates them to the RAS 218 in request 236. The RAS 218 uses the IP address to determine more attributes by indexing into the IP address attribute map 214 with the IP address from the agent 224.

Figure 6:
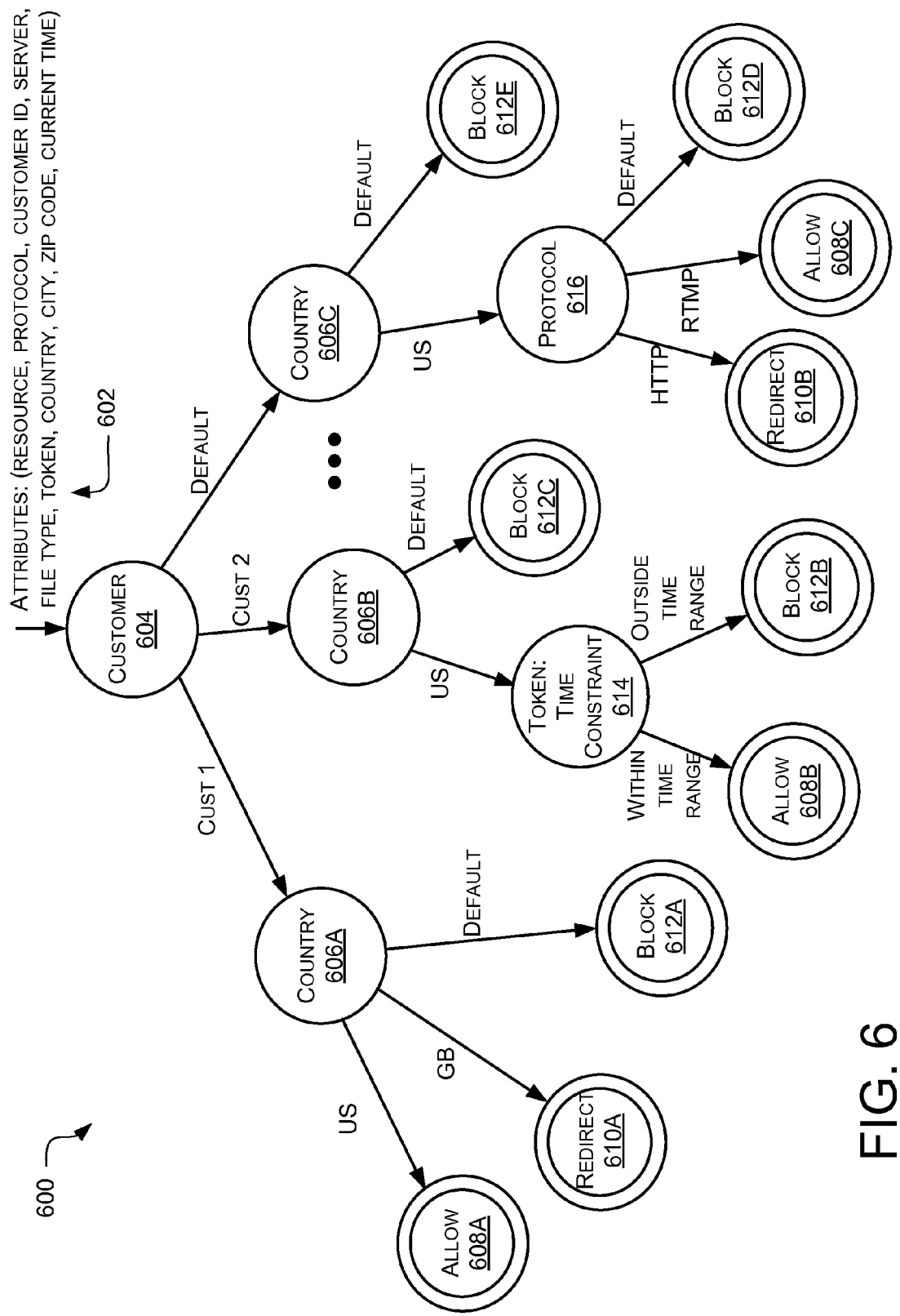
FIG. 6 is an example hierarchical exception based decision tree that may be used to handle content requests in a rule-based manner using flexible tokens according to various embodiments.

Using the real-time attributes and the semi-static attributes, and perhaps other attributes, the RAS 218 applies the business logic to determine how to handle the content request 234. In various embodiments, the application of the business logic involves traversing a hierarchy of data driven decision nodes. FIG. 6, discussed below, illustrates an example embodiment of a hierarchy of decision nodes and is discussed in detail below.

After the RAS 218 applies the business logic, a rule-based decision 238 is generated back to the agent 224. The rule-based decision 238 is incorporated into a response 240 back to the end-user browser 226. As discussed in detail below, the response 240 could be one of a number of different types of responses.

In one embodiment of the system 200, the rule generator 202 and the provision tool 208 operate on server computers centrally located in a CDN and the edge server computer 222 and the administration server computer 216 are located at another region of the CDN. In this embodiment, there may be multiple regions of the CDN in which each region has a cluster of one or more edge server computers and an administration server computer. The rule generator 202 and the provision tool 208 are operable to deploy their respective logic and data to the various regional administration computers.

Figure 3:
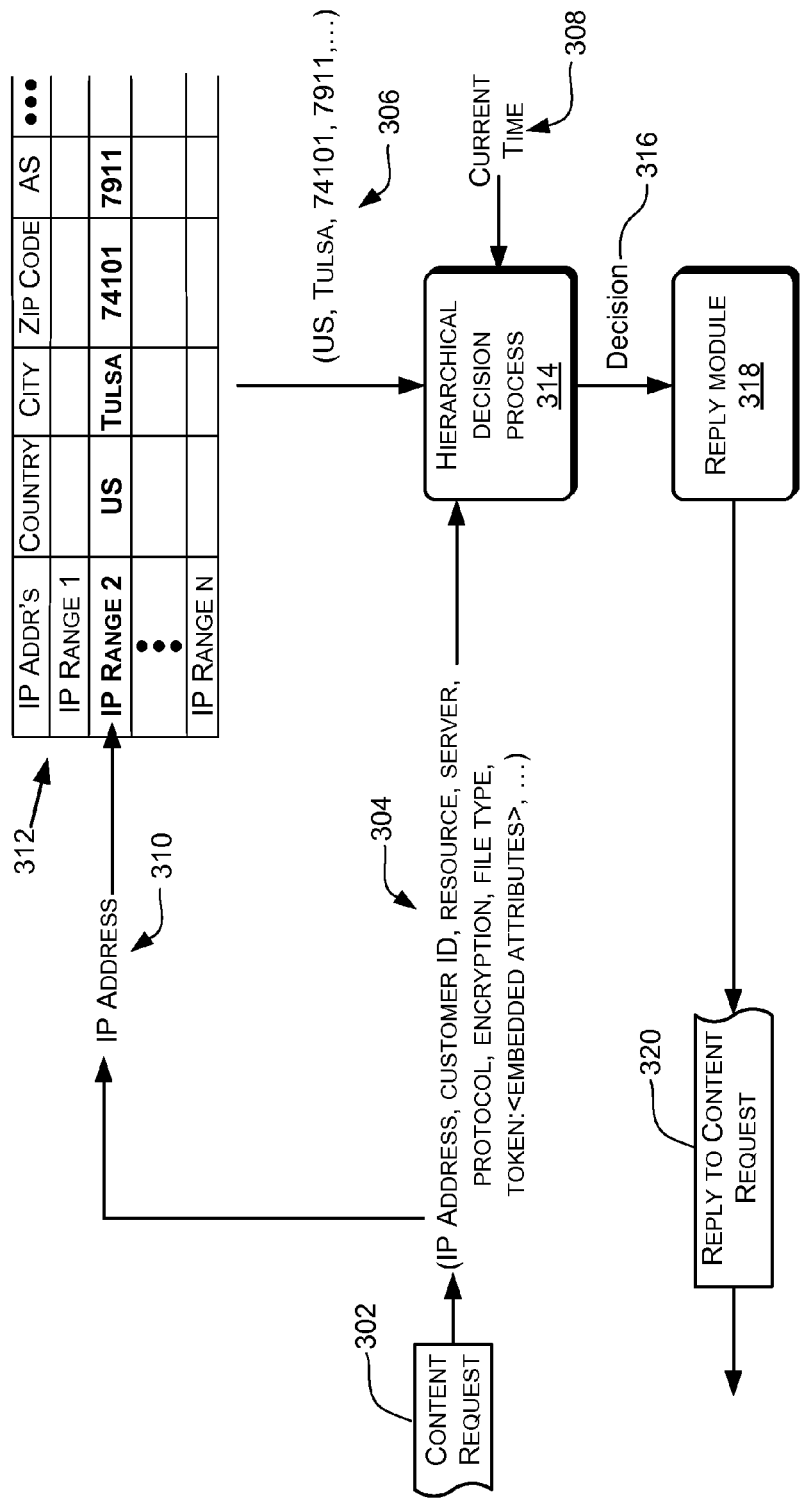
FIG. 3 illustrates an example scenario involving handling a content request using a flexible token.

FIG. 3 illustrates an example approach for rule-based handling of content requests that can make use of flexible tokens. In the illustrated scenario, three general types of attribute values are used to decide how to handle a content request 302: real-time attribute values 304, semi-static attribute values 306, and address-independent attribute values 308. In general, the attribute values are determined at the time of receipt of the content request. Some of the values are address-dependent and others of the attribute values are not address-dependent.

For example, real-time attribute values 304 include IP address, protocol, customer identifier (ID), requested resource, server, file type, token, and/or others, which depend on the received request and are established at the time of the request, or shortly after receipt of the request 302. When the request 302 is received, real-time attributes 304 are extracted, for example by an edge server agent 224 (FIG. 2), from the request 302 and packaged into a format that is parse-able by the hierarchical decision process 314.

Semi-static attributes 306, such as country, city, zip code, autonomous system (AS), and/or others, are determined based on the IP address 310. Therefore, the semi-static attribute values 306 depend upon the request, but they are not considered real-time attributes because they are established prior to the generation of the request and looked up at the time of the request. The semi-static attributes 306 are looked up in an IP address map 312 that maps IP addresses, or address ranges, to one or more respective semi-static attribute values. The IP address 310 is used as an index or key to look up attribute values in the map 312. In the particular scenario illustrated, the IP address 310 is determined to be in the IP address range 2 in the map 312.

The address-independent attribute values 308 include, but are not limited to current time, date or day of week when the request 302 is received. Time is the current time of day, which is not set by the IP address specified in the request. As such, time is independent of the IP address. As discussed herein, current time, date, and/or day of week can be used to compare with a time period, which may be provided in a token in the request 302. Other address-independent attribute values could be system attribute values that are not set or determined based on the IP address.

With further regard to the flexible token in the request 302, in one embodiment, the flexible token includes one or more parameter name/value pairs. In one embodiment, the flexible token values are encoded in base 64. An example of a flexible token prior to being encoded into base 64 is shown below:
 start_time=20080808113000&end_time=200808080 8130000&digest=2afda6bbc02153da236bd09245a3c 332, In the above example flexible token, "start_time", "end_time" and "digest" are parameter names. The numerical values are parameter values. As such, the example above includes three name/value pairs.

With further regard to the digest value, in one embodiment the digest value is an encoded version of one or more units of data. The digest message defines that units of data that go into the message that is then transformed by an encryption algorithm, such as a hashing algorithm (e.g., MD5), into a string of hexadecimal digits. In one embodiment the units of data that are encrypted into the digest message are:

<digest message> = <resource path>?<parameter list>#<secret phrase>
<resource path> = <path component>+
<path component> = '/'<segment>
<segment> = (<alpha>|<digit>|'-'|'.'|'_'|'~')+
<alpha> = 'a'|...|'z'|'A'|...|'Z'
<secret phrase> = <unreserved character in XML>+

An example message that can be used to generate a digest is shown here:
 /bigears/teens/john_joan.wmv?start_time=200808080 8113000&end_time=2008080808130000#ourlittlesecret The real-time attribute values 304, semi-static attribute values 306 and address-independent attribute values 308 are input to a hierarchical decision process 314 executing on a RAS. In various embodiments, the hierarchical decision process 314 is data driven. In such embodiments, at each node in the hierarchy, one or more of the attribute values input to that node, are tested against predetermined values, to thereby determine the output of the node or another node to execute. The hierarchical decision process 314 ultimately issues a handling decision 316, dictating how the content request is to be handled, and therefore, the contents or format of the reply to the content request.

The handling decision 316 is input to a reply module 318. Reply module 318 generates a reply 320 in response to the request 302. The reply 320 may include a response code as well as other information. For example, the reply 320 may include a code indicating whether or not the request for content is allowed, or whether the request is redirected to alternative content.

Figure 4:
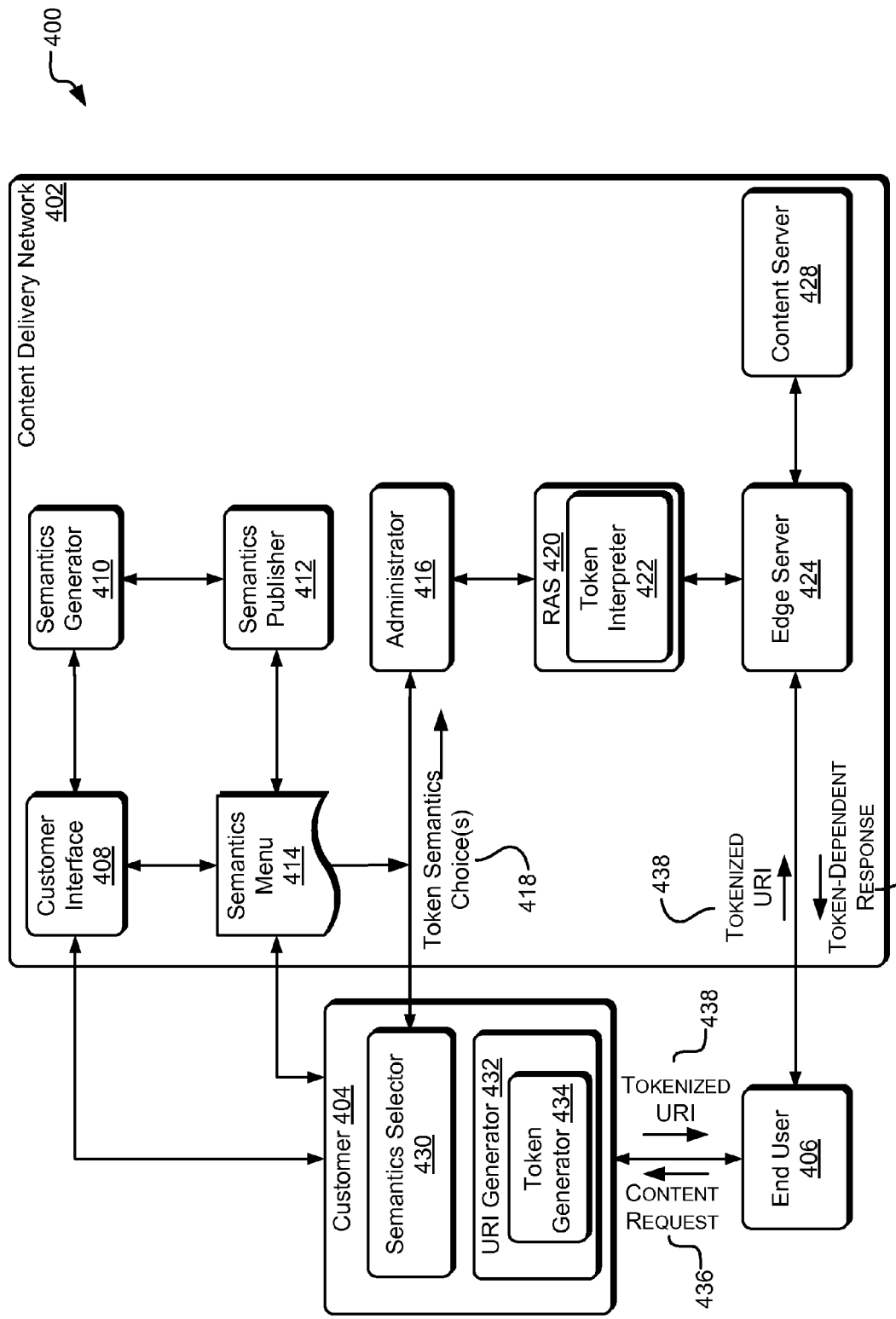
FIG. 4 illustrates a system which is configured to generate a menu of token semantics, receive token semantics selections and interpret token parameters according to the selected token semantics.

FIG. 4 illustrates another embodiment of a network configuration 400 that is operable to carry out content request handling using flexible tokens. The network configuration 400 includes a content delivery network 402, a customer network 404 and one or more end users 406.

The content delivery network 402 includes components and data for generating a menu of flexible token semantics and interpreting flexible token parameters in tokenized content designators. For example, the content delivery network 402 includes a customer interface 408, a semantics generator 410, and a semantics publisher 412, which produce a menu of flexible token semantics 414. Customer interface 408 may be a person or automated system, or combination thereof, which interface with the customer 404 to determine the customer's (e.g., content provider) preferred flexible token semantics.

The customer interface 408 can feed back customer preferences to the semantics generator 410. The semantics generator 410 can use the customer information and/or other information to generate a set of semantics for use in creating flexible tokens. The semantics publisher 412 publishes the generated semantics in a menu 414 that is accessible by the customer 404. In one embodiment the semantics menu 414 includes a list of parameter names and value formats. The customer 404 can choose which sets of parameter names and value formats the customer wants to use. Alternatively the customer 404 can use all of the listed parameter names and value formats.

In some embodiments, semantics in the semantics menu 414 may be bundled or packaged in groups. Such packaging of sets of token semantics may be useful for the customer and/or the content distributor. For example, certain sets of semantics may be compatible and therefore bundled together, while other combinations of the semantics may be incompatible and therefore not included in the same package. The content distributor may monetize the semantics in the menu 414, whereby the customer is charged for use of semantics. Monetization may be applied to each parameter name/value format pair and/or monetization may be applied to groups of multiple parameter name/value pairs.

In an embodiment, an administrator 416 receives the customer's semantics selections 418. The administrator 416 can be a provisioning system that configures the RAS 420. The selected semantics 418 are communicated to a request authorization server (RAS) 420, which includes a token interpreter 422. The token interpreter 422 is operable to interpret flexible tokens according to token semantics. The token interpreter 422 is configured to interpret token parameters in a manner that allows for flexibility in the order and format of parameter name/value pairs.

For example, the token interpreter 422 does not require that parameter name/value pairs appear in any particular order, or that any number of the parameter name/value pairs are in a given token. The parameter name/value pairs are self-defining and enable the token interpreter 422 to derive the meaning of the token without a rigid token format. Regardless of which parameter name/value pairs are in a token and regardless of their order, the token interpreter 422 can derive the meaning of any given token. In some cases, where the token interpreter 422 is unable to derive the meaning according to the semantics, the token interpreter 422 can use default values for parameters.

The RAS 420 communicates with the edge server 424 to facilitate generating appropriate responses to content requests from the end user 406. In one embodiment the RAS 420 uses the results from the token interpreter 422 to command the edge server 424 to generate the appropriate response. The edge server 424 generates a token-dependent response 426, which may include the requested content, alternative content, no content, a message, or otherwise. Content may be retrieved from a content server 428.

Referring now to the customer 404, the customer network may include a semantics selector 430 and a content designator generator, such as URI generator 432. The URI generator 432 can include a flexible token generator 434. The semantics selector 430 may be a person or automated system that selects one or more semantics from the semantics menu. In one embodiment, all of the semantics are used and no selection is performed.

The URI generator 432 is operable to receive a content request 436 from the end user 406 and generate the appropriate tokenized URI 438, which the user 406 can use to request content. The token generator 434 generates (e.g., creates and formats) a flexible token to be included in the URI 438. As discussed further herein, the flexible token includes one or more parameter name/value pairs, which do not need to be place in any particular order within the token. Rather, the name/value syntax itself is sufficient for the token interpreter 422 to determine the meaning of the token parameter(s). Of course, in some cases, the tokenized URI 438 does not include a token.

Figure 5:
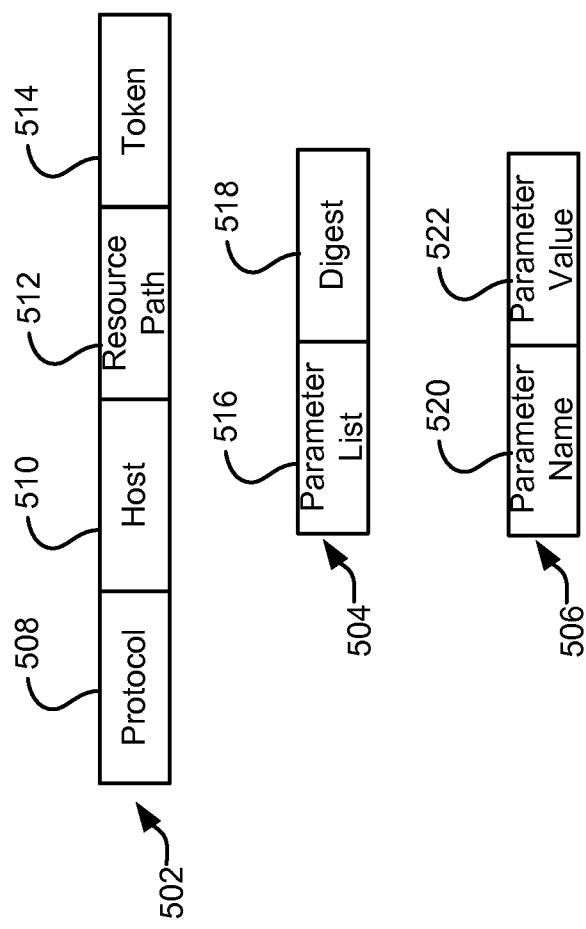
FIG. 5 illustrates example data formats for tokenized content designators, tokens and parameter designators.

FIG. 5 illustrates various units of data that can be used in a flexible token scheme for handling content requests. The data units are a tokenized URI 502, a token value 504, and a parameter name/value pair 506. The tokenized URI 502 includes a protocol field 508, a host field 510, a resource path 512 and a token 514.

As an example, the URI 502 may take on the following format:

```
<tokenized URI> = <protocol>://<host><resource path>?token=<token value>
<protocol> = RTSP|RTSPU|RTSPT|RTMP|RTMPE|RTMPS|HTTP
```

The attribute <host> is generally a dotted domain path (e.g., video.cdn.net) or an IP address in dotted decimal format. A specific example of a tokenized URI is shown here:
rtsp://bigearswm.fplive.com/bigears/teens/john_joan.wmv?flex_token=as4fd3dj8876dsdfrER454FGflj4534532sdsfd345FDGF3455dfdf.

The token value 504 generally includes a list 516 of parameters (e.g., parameter name/value pairs) and a digest 518. The digest can be used for user authentication and validation. An example format for the token value 504 is shown here:
  <token value>=<parameter list>&digest=<MD5 digest>
An example parameter list format and parameter formats are shown here:

```
<parameter list> = <parameter>|<parameter>&<parameter list>
<parameter> = start_time=<date and time> | <end_time>=<date and time>
<date and time> = <year><month><day><hour><minute><second>
<year> = <digit><digit><digit><digit>
<month> = ('0'|'1')<digit>
<day> = ('0'|'1'|'2'|'3')<digit>
<hour> = ('0'|'1'|'2')<digit>
<minute> = <digit-b6><digit>
<second> = <digit-b6><digit>
<digit> = '0'|'1'|'2' |'3'|'4' |'5'|'6' |'7'|'8' |'9'
<digit-b6> = '0'|'1'|'2' |'3'|'4' |'5'|'6'
<MD5 digest> = 32<hex digit>
<hex digit> = <digit>|'a'|'b'|'c'|'d'|'e'|'f'
```

The parameter 506 typically includes a parameter name 520 and a parameter value 522. The parameter 506 is also referred to as a parameter name/value pair or simply a name/value pair.

FIG. 6 is a tree diagram illustrating a hierarchy 600 of decision nodes in a particular scenario. As discussed above, the RAS is configured with a hierarchy of data driven decision nodes for carrying out the business logic. The decision nodes shown in FIG. 6 are arranged in a way to carry out example rule-based business logic. In one embodiment, the nodes are implemented as software objects in C++. In general, one or more attribute values are input to each node. Each node switches on one of the attributes to determine the output path. If the attribute that is switched on is not among the input attributes or if there is no specific switch route for the attribute value, the output path is a default path. Accordingly, every node has a default path.

In the particular scenario shown in FIG. 6, attribute values 602 are input to a top level node, which is a customer node 604. Customer node 604 switches on a customer ID attribute. In this embodiment, the customer ID corresponds to the content provider who provides content for distribution via the CDN. By switching on the customer ID, any decisions made after the customer node can be configured by the customer. In other words, the rule-based business logic can be formatted such that decision nodes after a customer node are based on the rules specifications from the customer.

For example, in the illustrated scenario, if customer 1 is identified in the attribute values 602, control is passed to a country node 606A, which executes business logic in accordance with the rules specified by customer 1. In the particular scenario of FIG. 6, if the attribute values 602 identify the United States as the country, control is passed to an allow node 608A. Allow node 608A generates an output indicating that the content request is allowed. If HTTP is the protocol being used, the allow node 608A generates a "200" code.

If, at country node 606A, the country attribute value is Great Britain, control is passed to a redirect node 610A. Redirect node 610A generates an output indicating that the content request is redirected in some fashion designated by the business logic. For example, business logic could designate an alternate resource, or a tailored message indicating that the request is denied. Of course, customer 1 could have specified in the rules which alternate resource or message the end user should be redirected to. If HTTP is the protocol being used, the redirect node 610A outputs a "302" code.

Returning to the country node 606A, in the particular embodiment, if neither the US or GB are the designated countries in the attribute values 602, then the default path is taken. The default path passes control to a block node 612A. The block node 612A generates an output indicating that the content request is denied. In HTTP the block node 612A outputs a "403" code.

Returning to the customer ID node 604, if customer 2 is identified in the attribute values 602, control passes to another country node 606B. Country node 606B and the nodes below the country node 606B implement business logic in accordance with the rules specified by customer 2. In the case of country node 606B, if the attribute values 602 identify the US as the country, control passes to a token:time constraint node 614. As discussed above, a token can be passed to an end user and where the token is embedded in a content request, thereby allowing the customer to further control how a content request is handled.

Token:time constraint node 614 analyzes time constraint data from a flexible token, if any was passed in the content request. A time constraint, which may be included in a flexible token, can generally be used to specify a time range within which the content request is valid. In the particular scenario illustrated in FIG. 6, token:time constraint node 614 switches on whether the current time is within or outside the time range specified by the time constraint. If the current time (i.e., time of receipt of the content request) is within the specified time range, control passes to another allow node 608B, which allows the content request. If the current time is outside the specified time range, control passes by default to another block node 612B, which denies the content request.

Returning again to customer node 604, if no customers are identified in the attribute values 602 that match customer IDs switched on by the customer node 604, control passes by default to another country node 606C. Country node 606C switches on the country data in the attribute values 602. In the particular scenario, if the US is not identified in the attribute values 602, control passes by default to another block node 612E, which denies the content request.

On the other hand, if the US is identified in the attribute values 602, control passes from the country node 606C to a protocol node 616. Protocol node 616 includes business logic that makes a decision based on the protocol associated with the content request. In the illustrated scenario, if HTTP and RTMP are not identified in the attribute values 602, control passes by default to another block node 612D, which denies the content request.

On the other hand, if HTTP is identified in the attribute values 602, control is passed to another redirect node 610B, which redirects the content request to an alternative resource. As discussed above, in the case of a redirect decision, the customer can specify the alternate resource or message that the user is redirected to. Alternatively, if RTMP is identified in the attribute values 602, control is passed to another allow node 608C, which allows the content request.

With regard to the hierarchy 600 shown in FIG. 6, the hierarchy 600 is for illustration purposes only to demonstrate one possible scenario using a data driven hierarchical decision tree. It will be understood by those skilled in the art that, in operation, numerous other types of nodes can be included in a hierarchy to carry out business logic. For example, other decision nodes may be a file type node, which makes a decision based on file type, and a file location node, which makes a decision based on the location of a file within a directory structure. Furthermore, the arrangement of the decision nodes is not fixed. Indeed, the nodes can be arranged in numerous ways to implement all variations of business logic.

Figure 7:
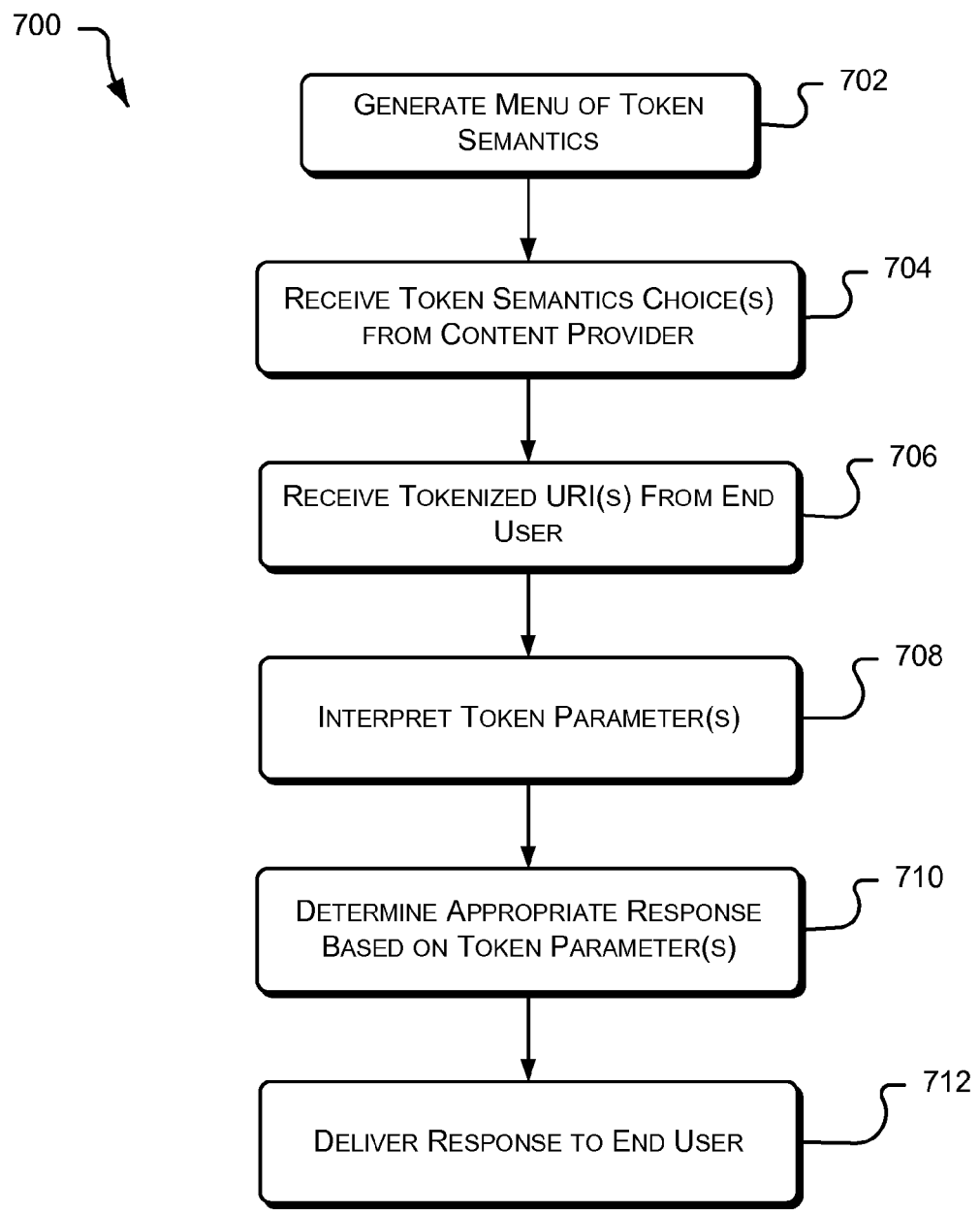
FIG. 7 is a flow chart illustrating an example process which may be carried out by a content distributor for handling content requests using flexible tokens.

FIG. 7 is a flowchart illustrating a process for handling content requests using flexible tokens. In one embodiment the content handling process 700 is carried out by a content distributor, such as via a content distribution or delivery network. As an overview, the content handling process 700 is configured to generate a menu of token semantics, receive a customer's selection of a set of one or more token semantics, and interpret tokenized content designators according to the selected semantics, while allowing for flexibility in the format (e.g., order of parameter name/value pairs) and content of the tokens.

A generating operation 702 generates a menu of token semantics. In one embodiment, the menu of token semantics is a list of parameter name/value pairs that a customer can use to specify constraints related to distribution of content. The generating operation 702 may also include monetizing the parameter name/value pairs.

In an optional receiving operation 704, selected semantics are received from the customer. In one embodiment, all the semantics are used and the customer does not actually select from among them. Semantics selection by the content provider may be performed in an automated fashion (e.g., through an online (electronic) form) or manually (e.g., submitting a paper form and/or through person-to-person interaction).

In another receiving operation 706, a tokenized URI is received from an end user. The tokenized URI includes a flexible token having a flexible format, rather than a fixed format. For example, token parameter name/value pairs may be in virtually any order within the token. The name/value pairs are therefore order-independent. Furthermore there is no requirement for which, or if any, name/value pairs are included in the token. The customer has discretion as to which, if any, parameter name/value pairs are included and in what order.

An interpreting operation 708 interprets the token in the tokenized URI. Interpreting operation 708 may include parsing the token to extract parameter name(s) and parameter value(s). Interpreting operation 708 may further include decrypting, decoding, and/or formatting data from the token to authenticate, validate and otherwise derive the meaning of the parts of the token.

A determining operation 710 then uses the interpreted token parameters to determine how to respond to the content request. The determining operation 710 analyzes the parameter values to determine whether the requested content should be sent to the requester. The determining operation 710 may determine that no content should be sent, or alternative content should be sent. For example the parameters in the flexible token may indicate alternative content to be sent to the end user, if the token's parametric constraints are not met.

To illustrate, the parameters may indicate a particular time period or geographic region within which the end user's request may be satisfied. The parameters may also indicate alternative content to send if the constraints are not satisfied. If the request was not sent within the designated time period, for example, or the end user is not located within the designated geographic region, then the designated alternative content will be selected for the response.

The determining operation 710 may determine that the appropriate response is to send a message (e.g., a "403" message) that provide information as to why a content request is not satisfied. If the constraints set forth by the token parameters are met, then the requested content is sent to the end user. A delivering operation 712 delivers the determined response to the end user.

Figure 8:
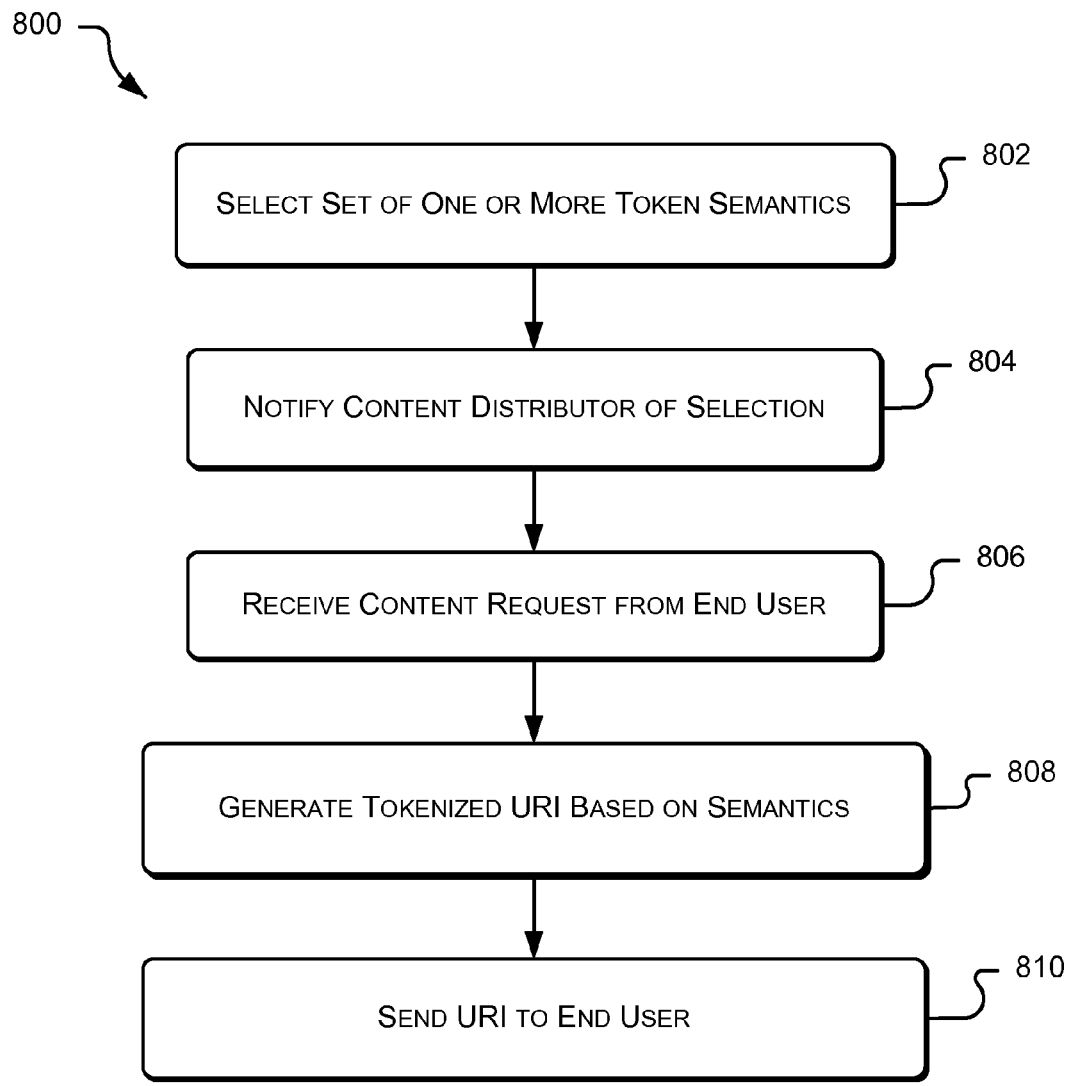
FIG. 8 is a flow chart illustrating an example process which may be carried out by a content provider for selecting a set of token semantics and generating tokenized content designators.

FIG. 8 is a flowchart illustrating a process that can be carried out by a customer (e.g., a content provider) of a content distribution network to make use of flexible tokens in managing how, when and where content is distributed. It is assumed that the content distributor publishes a set of token semantics to the content provider, wherein the semantics define parameter name/value pairs.

An optional selecting operation 802 selects one or more of the token semantics to be used in generating flexible tokens. In some embodiments all the token semantics are available for use and there is no selecting step. A notifying operation 804 may notify the content distributor of which token semantics are selected for use. The content distributor may maintain a ledger of which customers use which token semantics.

A receiving operation 806 receives a request for content from an end user. The request for content 806 generally specifies a name of a file or other resource. After receiving the request for content, the customer generates a flexible token in generating operation 808. The generating operation 808 creates and formats the token parameters based on the token semantics that are being used. As discussed herein, the generating operation 808 is not limited to a fixed format when including parameters in the flexible token. Rather, the generating operation 808 can choose any or none of the parameters from the semantics to be included in the token. In addition, the generating operation can put the parameters in any order.

After the tokenized URI is generated, a sending operation 810 sends the tokenized URI to the end user who requested the content. The tokenized URI may have a format such as that discussed above with respect to FIG. 5.

Figure 9:
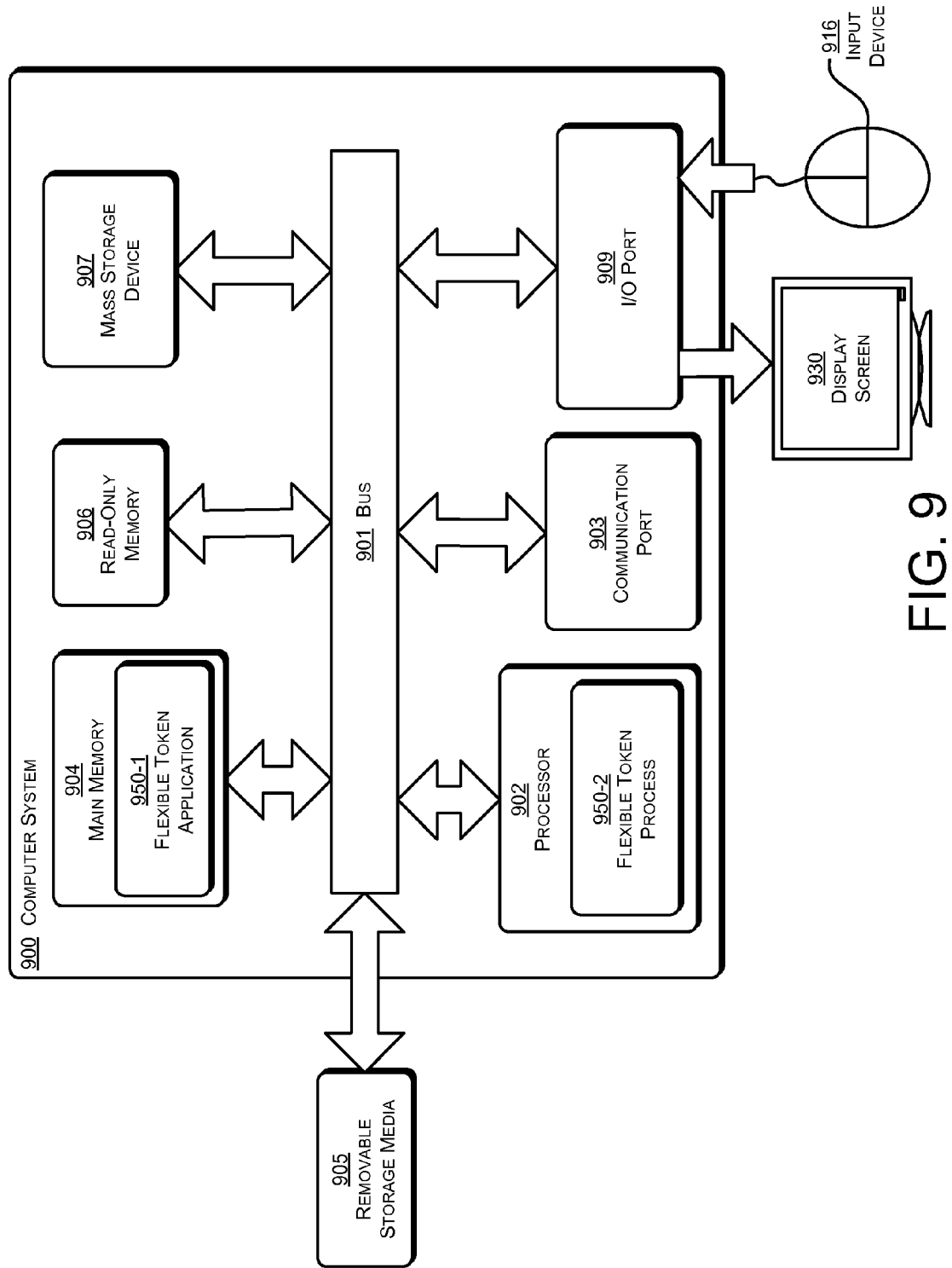
FIG. 9 is an example block diagram of a computer system configured with a flexible token application and process according to embodiments herein.

FIG. 9 is a schematic diagram of a computer system 900 upon which embodiments of the present invention may be implemented and carried out. For example, one or more computing devices 900 may be configured to handle content requests using flexible tokens and or generate or select a set of token semantics that define parameters that can be used in flexible tokens. Computer system 900 generally exemplifies any number of computing devices, including general purpose computers (e.g., desktop, laptop or server computers) or specific purpose computers (e.g., embedded systems).

According to the present example, the computer system 900 includes a bus 901 (i.e., interconnect), at least one processor 902, at least one communications port 903, a main memory 904, a removable storage media 905, a read-only memory 906, and a mass storage 907. Processor(s) 902 can be any known processor, such as, but not limited to, an Intel® Itanium® or Itanium 2® processor(s), AMD® Opteron® or Athlon MP® processor(s), or Motorola® lines of processors.

Communications ports 903 can be any of an RS-232 port for use with a modem based dial-up connection, a 10/100 Ethernet port, a Gigabit port using copper or fiber, or a USB port. Communications port(s) 903 may be chosen depending on a network such as a Local Area Network (LAN), a Wide Area Network (WAN), or any network to which the computer system 900 connects. The computer system 900 may be in communication with peripheral devices (e.g., display screen 930, input device 916) via Input/Output (I/O) port 909.

Main memory 904 can be Random Access Memory (RAM), or any other dynamic storage device(s) commonly known in the art. Read-only memory 906 can be any static storage device(s) such as Programmable Read-Only Memory (PROM) chips for storing static information such as instructions for processor 902. Mass storage 907 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 901 communicatively couples processor(s) 902 with the other memory, storage and communications blocks. Bus 901 can be a PCI/PCI-X, SCSI, or Universal Serial Bus (USB) based system bus (or other) depending on the storage devices used. Removable storage media 905 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 904 is encoded with a flexible token application 950-1 that supports functionality as discussed herein. For example, flexible token application 950-1 can include the semantics generator 410 and/or the token interpreter 422 of FIG. 4. Flexible token application 950-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 902 accesses main memory 904 via the use of bus 901 in order to launch, run, execute, interpret or otherwise perform the logic instructions of the flexible token application 950-1. Execution of flexible token application 950-1 produces processing functionality in flexible token process 950-2. In other words, the flexible token process 950-2 represents one or more portions of the flexible token application 950-1 performing within or upon the processor(s) 902 in the computer system 900.

It should be noted that, in addition to the flexible token process 950-2 that carries out operations as discussed herein, other embodiments herein include the flexible token application 950-1 itself (i.e., the un-executed or non-performing logic instructions and/or data). The flexible token application 950-1 may be stored on a computer readable medium (e.g., a repository) such as a floppy disk, hard disk or in an optical medium. According to other embodiments, the flexible token application 950-1 can also be stored in a memory type system such as in firmware, read only memory (ROM), or, as in this example, as executable code within the main memory 904 (e.g., within Random Access Memory or RAM). For example, flexible token application 950-1 may also be stored in removable storage media 905, read-only memory 906, and/or mass storage device 907.

Example functionality supported by computer system 900 and, more particularly, functionality associated with flexible token application 950-1 and flexible token process 950-2 is discussed above in detail with reference to FIGS. 1-8.

In addition to these embodiments, it should also be noted that other embodiments herein include the execution of the flexible token application 950-1 in processor(s) 902 as the flexible token process 950-2. Thus, those skilled in the art will understand that the computer system 900 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer implemented method comprising:
using one or more processors to perform the steps of:
generating a menu of selectable token semantics, wherein the token semantics specify one or more parameter names available for inclusion in a flexible token, wherein the flexible token is configured to include one or more parameter name/value pairs, and wherein the one or more parameter name/value pairs can occur in any order;
receiving a selection of one or more of the token semantics;
receiving a tokenized content designator including a flexible token having one or more parameter name/value pairs formatted according to the selected one or more token semantics, the tokenized content designator including a network location associated with obtaining content;
interpreting the one or more parameter name/value pairs according to the selected one or more token semantics; and
determining a response to the tokenized content designator based on the interpreted one or more parameter name/value pairs,
wherein the token semantics further specify constraints to be satisfied in relation to distribution of the content.

2. The computer implemented method of claim 1, wherein the parameter name/value pairs specify business logic.

3. The computer implemented method of claim 1, wherein the one or more parameter name/value pairs comprise embedded parameter name/value pairs.

4. The computer implemented method of claim 1, wherein the response includes one or more of a message, content designated by the tokenized content designator, or alternative content.

5. The computer implemented method of claim 1, wherein the flexible token is generated by a content provider.

6. The computer implemented method of claim 5, wherein the content provider inserts the flexible token in the tokenized content designator and sends the tokenized content designator to an end user who requested the designated content.

7. The computer implemented method of claim 1, wherein the method further comprises sending a token-dependent response to an end user.

8. The computer implemented method of claim 1, wherein the one or more parameter name/value pairs comprises one or more geographic name/value pairs, one or more time name/value pairs, one or more encryption name/value pairs, and an alternative content name/value pair.

9. The computer implemented method of claim 1 wherein the network location associated with obtaining content includes a uniform resource locator.

10. The computer implemented method of claim 1 wherein the network location associated with obtaining content include a uniform resource identifier.

11. The computer implemented method of claim 1 wherein one or more name/value pairs define to constraints to be satisfied in relation to distributing the content.

12. The computer implemented method of claim 1 wherein the menu of selectable token semantics is a user selectable menu of token semantics.

13. A system for managing delivery of content to end users, the system comprising:
one or more processors operable to execute:
a semantics generator configured to generate name/value pair semantics for name/value pairs that can be included in flexible tokens;

a semantics publisher configured to publish the name/value pair semantics in a user menu, wherein the name/value pair semantics are user selectable;

a flexible token interpreter configured to interpret name/value pairs included in flexible tokens according to the name/value pair semantics, the flexible token interpreter further configured to determine responses to content requests based on the name/value pairs included in flexible tokens; and an edge server configured to generate token-dependent responses to content requests based on determined responses from the flexible token interpreter, wherein the name/value pairs define constraints to be satisfied in relation to distributing content.

14. The system of claim 13, wherein at least one flexible token includes embedded name/value pairs.

15. The system of claim 13, wherein the name/value pairs include one or more location name/value pairs, one or more time name/value pairs, one or more encryption name/value pairs and an alternative content name/value pair.

16. The system of claim 13, wherein name/value pair semantics are selected by a semantics selector of a customer.

17. The system of claim 13, wherein the name/value pair semantics are monetized.

18. The system of claim 13, wherein the edge server receives the flexible tokens inserted in content designators and sends the flexible tokens to the flexible token interpreter.

19. The system of claim 18 wherein the content designator further includes a network location associated with obtaining content.

20. The system of claim 19 wherein the network location associated with obtaining content includes a uniform resource locator.

21. The system of claim 20 wherein the network location associated with obtaining content includes a uniform resource identifier.

22. A computer program product comprising non-transitory computer-readable media that stores computer-executable instructions, which, when executed by a computer, cause the computer to carry out a process, the process comprising:

receiving a menu of selectable token semantics, wherein the token semantics specify one or more parameter names available for inclusion in a flexible token, wherein the flexible token is configured to include one or more parameter name/value pairs formatted according to the selected one or more token semantics, receiving a tokenized content designator specifying a network location associated with requested content, wherein the tokenized content designator includes a flexible token indicating terms of responding to receipt of the content designator;

interpreting name/value pairs included in the flexible token, wherein the name/value pairs are order-independent;

generating a response to the content designator based on interpretation of the order-independent name/value pairs, wherein the token semantics further specify constraints to be satisfied in relation to distribution of the content.

23. The computer program product of claim 22, wherein the process further comprises determining whether the requested content should be sent in response to receipt of the content designator.

24. The computer program product of claim 22, wherein the process further comprises generating a set of name/value pair semantics that are selectable by a content provider.

25. The computer program product of claim 24, wherein the process further comprises monetizing the name/value pair semantics.

26. The computer program product of claim 24, wherein the tokenized content designator is generated by the content provider.

27. The computer program product of claim 24, further comprising receiving selections from the set of name/value pair semantics from the content provider.

28. The computer program product of claim 22 wherein the network location associated with obtaining content includes a uniform resource locator.

29. The computer program product of claim 22 wherein the network location associated with obtaining content include a uniform resource identifier.

* * * * *